United States Patent
Chiu et al.

(10) Patent No.: US 7,800,612 B2
(45) Date of Patent: Sep. 21, 2010

(54) APPARATUS, METHOD, AND COMPUTER READABLE MEDIUM THEREOF FOR DRAWING 3D WATER SURFACE ACCORDING TO A REAL WATER SURFACE HEIGHT

(75) Inventors: Yung-Feng Chiu, Taichung (TW); Chun-Fa Chang, Taipei (TW); Yu-Jung Cheng, Yilan County (TW)

(73) Assignee: Institute for Information Industry, Taipei (TW)

( * ) Notice: Subject to any disclaimer, the term of this patent is extended or adjusted under 35 U.S.C. 154(b) by 747 days.

(21) Appl. No.: 11/683,525

(22) Filed: Mar. 8, 2007

(65) Prior Publication Data
US 2008/0143713 A1 Jun. 19, 2008

(30) Foreign Application Priority Data
Dec. 18, 2006 (TW) .............................. 95147440 A (51) Int. Cl.
*G06T 17/00* (2006.01)
(52) U.S. Cl. .................... 345/420; 345/419; 345/473; 345/582; 345/585; 345/629; 345/647
(58) Field of Classification Search ................. 345/419, 345/420, 426, 473, 589, 592, 629, 632, 582, 345/585, 619, 647
See application file for complete search history.

(56) References Cited

U.S. PATENT DOCUMENTS

| | | | |
|---|---|---|---|
| 5,537,641 A | 7/1996 | Da Vitoria Lobo et al. | |
| 6,747,649 B1 * | 6/2004 | Sanz-Pastor et al. | 345/428 |
| 6,985,148 B2 | 1/2006 | Liang et al. | |
| 7,038,694 B1 * | 5/2006 | Santodomingo et al. | 345/582 |
| 7,050,058 B2 | 5/2006 | Liang et al. | |
| 2005/0219249 A1 * | 10/2005 | Xie et al. | 345/473 |
| 2008/0068386 A1 * | 3/2008 | Lin et al. | 345/473 |

OTHER PUBLICATIONS

Yann Lombard "realistic natural Effect Rendering water", Posted Sep. 7, 2004.*
Langer et al. "A Spectral-particle hybrid method for rendering faling snow". Published 2004.*
Enright et al. "Animation and Rendering of Complex Water Surfaces", published 2002-2003.*

* cited by examiner

*Primary Examiner*—Kimbinh T Nguyen
(74) *Attorney, Agent, or Firm*—Patterson Thuente Christensen Pedersen, P.A.

(57) ABSTRACT

The invention generates the water grids in each of the visible range of the water wave maps and the third dimension coordinates according to the intersecting points. The third dimension coordinates are corresponded to the actual water height. Finally, the invention generates a water surface having the wave change according to the third dimension coordinates. And the invention can obtain the information of the water height dynamically, generate the water surface image having the light change, including the effect of reflection and refraction, according to the information of the water height, and make the water image corresponding to the actual water.

22 Claims, 12 Drawing Sheets

APPARATUS, METHOD, AND COMPUTER READABLE MEDIUM THEREOF FOR DRAWING 3D WATER SURFACE ACCORDING TO A REAL WATER SURFACE HEIGHT

This application claims priority to Taiwan Patent Application No. 095147440 filed on Dec. 18, 2006 of which the contents are incorporated herein by reference in its entirety.

CROSS-REFERENCES TO RELATED APPLICATIONS

Not applicable.

BACKGROUND OF THE INVENTION

1. Field of the Invention

The present invention relates to an apparatus, a method, and a computer readable medium thereof for drawing a 3D water surface. More specifically, it relates to an apparatus, a method, and a computer readable medium thereof for drawing a 3D water surface according to an actual water surface height.

2. Descriptions of the Related Art

With the growth of the science and technology, the life of people depends on the science and technology more and more. The 3D animation frequently appears in movies and computer games nowadays. Due to the maturity of the image technology, a picture of the 3D animation almost approximates the real-world view. Among 3D images, the image of a water surface is one of difficult 3D images to present. In addition to the wave shape of the water surface, there is also light change on the water surface. Hence, it is one important step to generate a reflection effect and a refraction effect of the water surface. In general, the reflection effect and the refraction effect are generated based on the following equation:

$$C_{result}=F(\theta)*C_{reflect}+(1-F(\theta))*C_{refract} \quad (1)$$

wherein $C_{result}$ is the color of the water surface, $C_{reflect}$ and $C_{refract}$ are the reflection color and the refraction color respectively, and $F(\theta)$ is Fresnel coefficient. Generally speaking, the reflection can be divided into two parts: the environment reflection $C_{environment}$ and the object reflection $C_{localreflect}$. They can be represented by the following equation;

$$C_{reflect}=C_{environment}+C_{localreflect} \quad (2)$$

$C_{environment}$ and $C_{localreflect}$ are mapped on the water surface via reflection vectors and projection vectors. To further show the change of the depth of the water, the refraction colors of the object in the water also need considering. The following equation can be used:

$$C_{refract}=e^{-f(y)}*C_{objectcolor}+(1-e^{-f(y)})*C_{watercolor} \quad (3)$$

wherein $C_{objectcolor}$ is the original color of the object, $C_{watercolor}$ is the color of the object in the water, and $e^{-f(y)}$ is a ratio coefficient for mixing the two colors.

Figure 1:
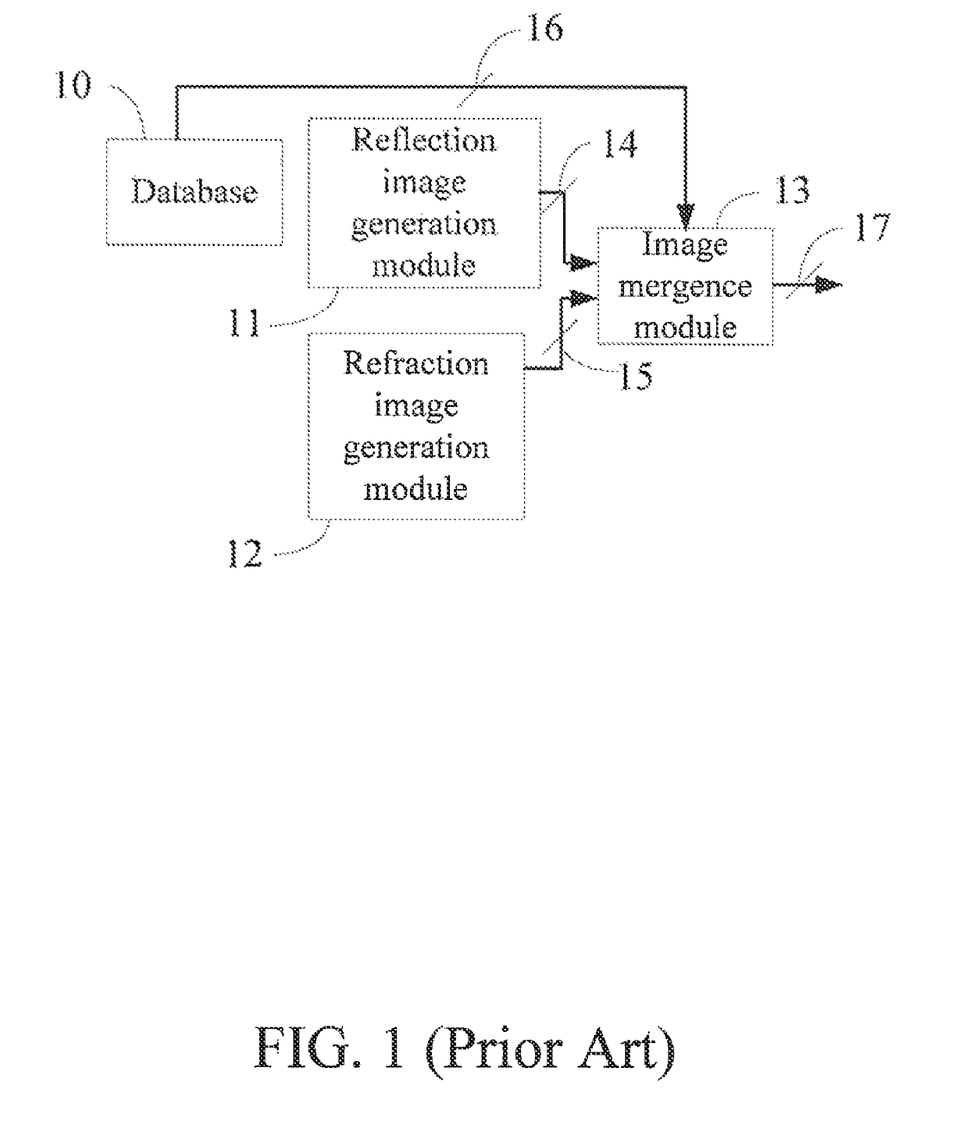
FIG. 1 is a schematic diagram of a conventional apparatus for drawing a water surface.

FIG. 1 is a conventional apparatus 1 for drawing a water surface image. The apparatus 1 comprises a database 10, a reflection image generation module 11, a refraction image generation module 12, and an image mergence module 13. The database 10 stores a water wave map 16. The reflection image generation module 11 and the refraction image generation module 12 respectively generate a reflection image 14 and a refraction image 15 according to a fixed water height, wherein the fixed water height is the surface when the water is calm. After that, the image mergence module 13 utilizes the equation (1) to merge the water wave map 16, the reflection image 14, and the reflection image 15 into a water surface image 17.

Figure 2:
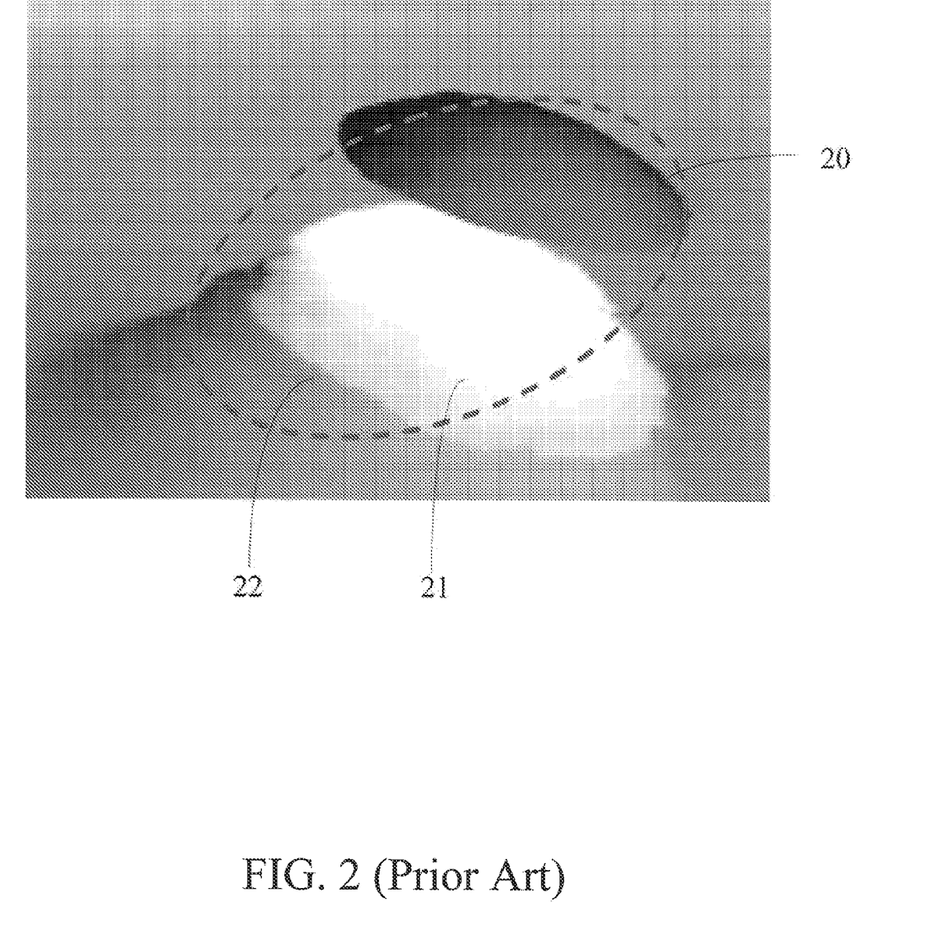
FIG. 2 is a 3D picture drawn with the conventional apparatus.
Figure 3:
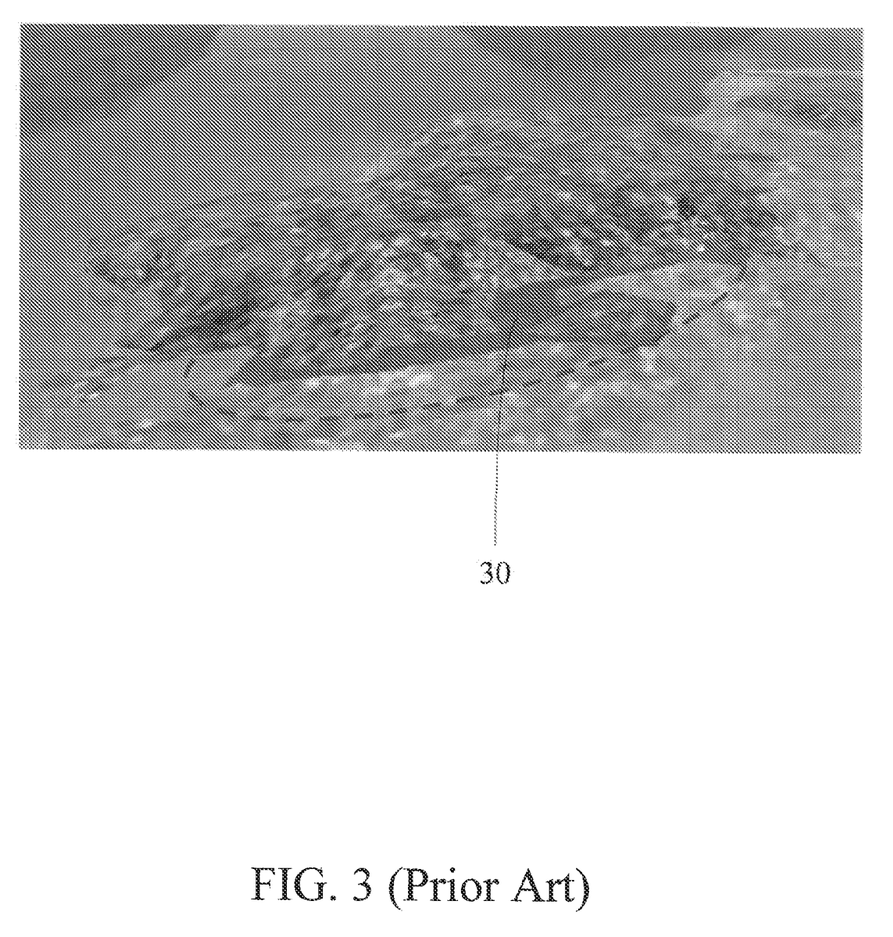
FIG. 3 is another 3D picture drawn with the conventional apparatus.

The conventional apparatus 1 does not consider the actual water surface height when the reflection image 14 and the refraction image 15 are generated. More particularly, the conventional apparatus 1 sets the water surface height, y axis, is always 0 to generate the reflection image 14 and the refraction image 15. However, it only occurs when the water is calm. If the water has big waves, the errors of displaying the image of the water surface occur. As the FIG. 2 shows, bubbles 21, supposed to be around a rock 20, is not around the rock 20 and a refraction 22 of the part of rock 20 under the water apparently breaks off the position of the rock 20. Another error as shown in FIG. 3 is that the conventional apparatus 1 erroneously determines the refraction as the reflection 30. The errors shown in FIG. 2 and FIG. 3 occur because the reflection image and the refraction image are generated according to the fixed water height, but not the actual water height.

Consequently, how to represent an actual water surface and make the 3D animation is closer to the real water to increase the value of the 3D animation industry is still an object for the industry to endeavor.

SUMMARY OF THE INVENTION

One objective of this invention is to provide an apparatus for drawing a water surface. The apparatus comprises a map mergence module, a first generation module, a coordinate generation module, and an image generation module. The map mergence module is used to merge a plurality of water wave maps into a merged water wave map. The first generation module is used to generate a plurality of first water grids in a visible range of each of the water wave maps and generate a plurality of second water grids in the visible range of the merged waves map, wherein each of the first water grids and the second water grids has a two-dimension coordinate. The coordinate generation module is used to generate a plurality of corresponding third-dimension coordinates according to the two-dimension coordinates of the first water grids. The image generation module is used to generate the water surface according to the corresponding third-dimension coordinates and the two-dimension coordinates of the second water grids.

Another objective of this invention is to provide a method of drawing a water surface. The method comprises the following steps: merging a plurality of water wave maps into a merged water wave map; generating a plurality of first water grids in a visible range of each of the water wave maps, wherein each of the first water grids has a two-dimension coordinate; generating a plurality of second water grids in the visible range of the merged waves map, wherein each of the second water grids has a two-dimension coordinate; generating a plurality of corresponding third-dimension coordinates according to the two-dimension coordinates of the first water grids; and generating the water surface according to the corresponding third-dimension coordinates and the two-dimension coordinates of the second water grids.

Yet a further objective of the invention is to provide a computer readable medium for storing a computer program. The computer program makes an apparatus to execute a method for drawing a water surface image. The method comprises the following steps: merging a plurality of water wave maps into a merged water wave map; generating a plurality of first water grids in a visible range of each of the water wave maps, wherein each of the first water grids has a two-dimension coordinate; generating a plurality of second water grids in the visible range of the merged waves map, wherein each of the second eater grids has a two-dimension coordinate; generating a plurality of corresponding third-dimension coordinates according to the two-dimension coordinates of the first water grids; and generating the water surface according to the corresponding third-dimension coordinates and the two-dimension coordinates of the second water grids.

The invention is capable of dynamically obtaining the information of the actual water surface height and generating a water surface image according to the information of the actual water surface height. If there are objects under or above the water surface, such as rocks, boats, or whales, the invention further generates the reflection image and the refraction image thereof according to the information of the actual water surface height. The reflection image, the refraction image, and the water surface image are all merged to create a more realistic 3D picture in order to increase the value of the 3D animation industry.

DESCRIPTION OF THE PREFERRED EMBODIMENT

Figure 4:
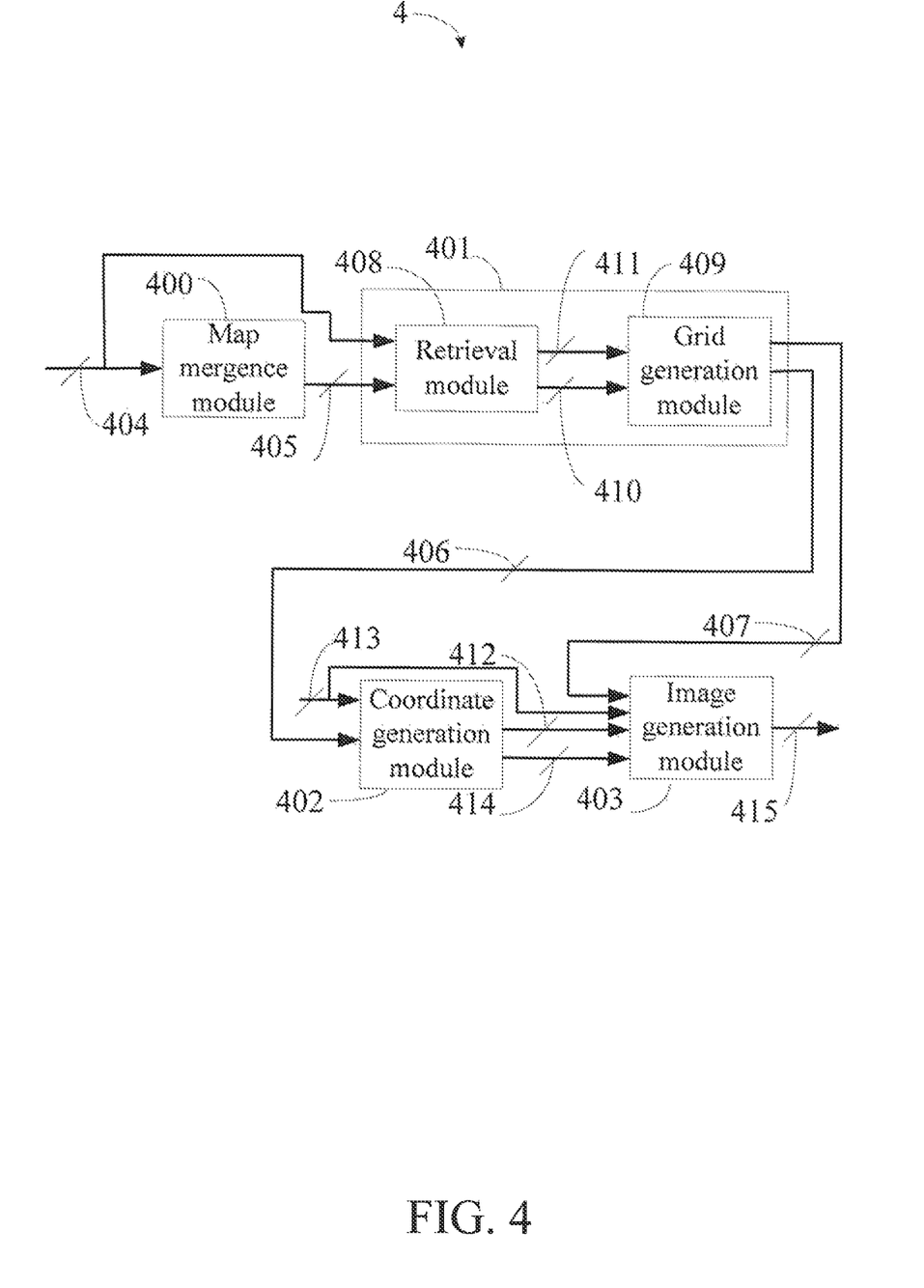
FIG. 4 is a schematic diagram of a first embodiment of the invention.
Figure 5:
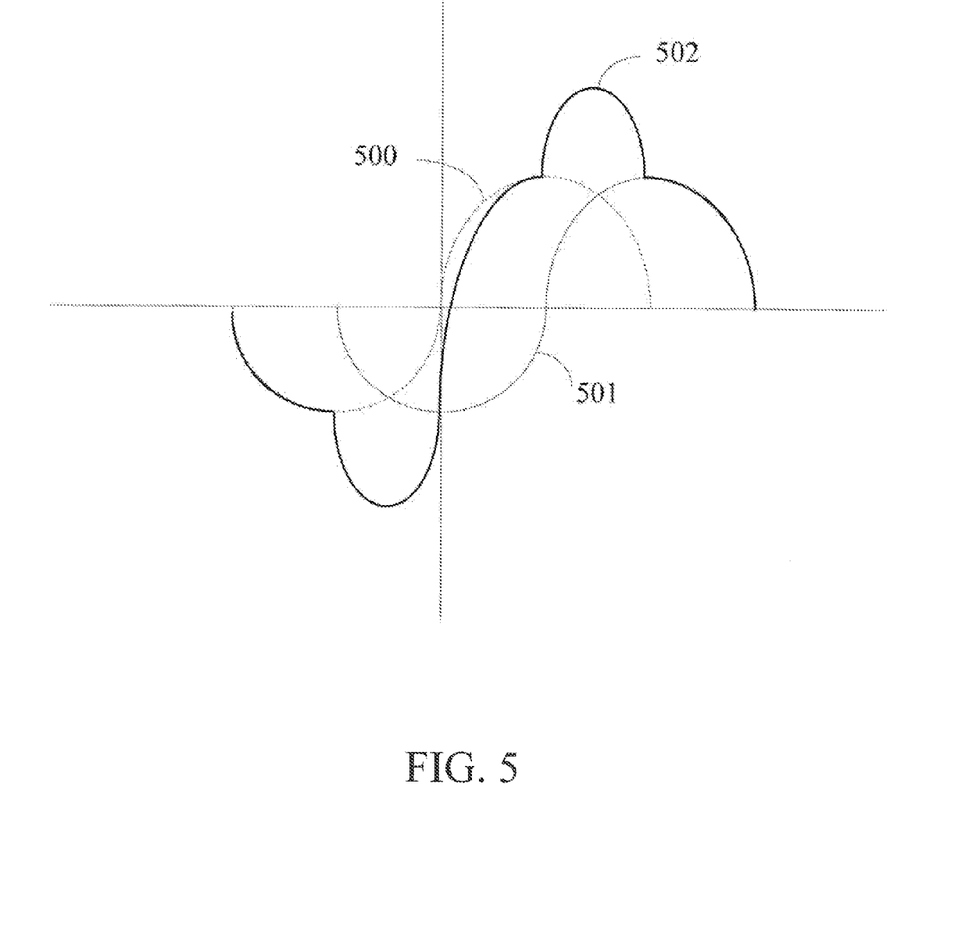
FIG. 5 is an oscillogram of sine waves.

A first embodiment of the invention is shown in FIG. 4, which is a schematic diagram of an apparatus 4 for drawing a water surface. The apparatus 4 comprises a map mergence module 400, a first generation module 401, a coordinate generation module 402, and an image generation module 403. The map mergence module 400 receives a plurality of water wave maps 404, wherein the water wave maps 404 are pre-generated. Most of the water wave maps 404 in the art, generated by a CPU, are sine wave maps, cosine wave maps, and/or fast Fouier transform wave maps. If the water wave maps 404 are the sine wave maps, simply one of the water wave maps 404 used to generate the water waves is dull. As shown in FIG. 5, sine waves 500 and 501 are carried in the different water wave maps 404. As one can observe, only one of the sine waves 500 and 501 to represent the waves of the water surface looks unreal because, in the real world, the waves of the water surface are not so regular. If the sine waves 500 and 501 are merged into a merged sine wave 502 by adding them, the merged sine wave 502 is closer to real water waves. So the map mergence module 400 is used to merge the water wave maps 404 into a merged water wave map 405, wherein the merged water wave map 405 is a 2D map.

Figure 6:
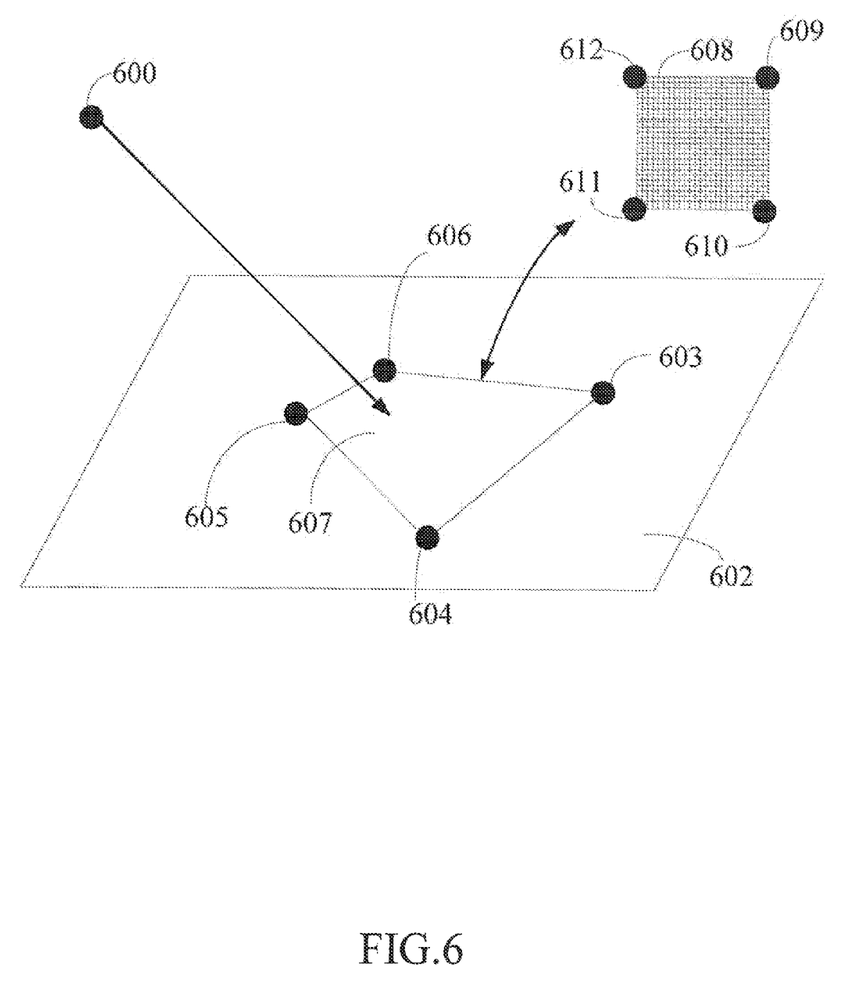
FIG. 6 is a schematic diagram of a water surface in view of human eyes.

As shown in FIG. 6, when human beings look down at a water surface 602, an actual water surface 607 represents in the eyes due to an angle of view. The shape of the actual water surface 607 is approximately a trapezoid which is defined by four apexes 603, 604, 605, and 606. However, it is difficult to do the following process based on the trapezoid. Therefore, the first generation module 401 converts the actual water surface 607 into a rectangle grid map 608. More particularly, the apexes 609, 610, 611, and 612 of the rectangle grid map 608 correspond to the apexes 603, 604, 605, and 606, respectively. The rectangle grid map 608 comprises a lot of grids each of which has a two-dimension coordinate, wherein the two-dimension coordinate corresponds to the coordinate of the water surface image in x-axis and z-axis.

More particularly, the first generation module 401 comprises a retrieval module 408 and a grid generation module 409. The retrieval module 408 generates four first reference points 410 on the boundary of the actual water surface 607 of each of the water wave maps 404. In particular, the first reference points 410 are the apexes of the actual water surface 607, i.e., the apexes 603, 604, 605, and 606 in FIG. 6. Then, the first reference points 410 are transmitted to the grid generation module 409. Furthermore, the retrieval module 408 also generates four second reference points 411 on the boundary of the actual water surface 607 of the merged water wave map 405. Similarly, the second reference points 411 are the apexes of actual water surface 607, i.e., the apexes 603, 604, 605, and 606 in FIG. 6. Then, the second reference points 411 are transmitted to the grid generation module 409 as well. In conclusion, the retrieval module 408 is used to define the actual water surface 607 on the water wave maps 404 and the merged water wave map 405 respectively and retrieve four apexes from the actual water surface 607 of each map.

The grid generation module 409 converts the actual water surface 607 of the water wave maps 404 and the merged water wave map 405 into the grid maps 608. Next, the grid generation module 409 uses a pixel shader to generate the first water grids 406 in the corresponding rectangles, as the grids in the grid map 608, according to the first reference points 410, wherein each of the first water grids 406 has a two-dimension coordinate in x-axis and z-axis. Furthermore, the grid generation module 409 generates the second water grids 407 in the corresponding rectangle, as the grids in the grid map 608, according to the second reference points 411, wherein each of the second water grids 407 has a two-dimension coordinate in x-axis and z-axis.

According to the two-dimension coordinate of each of the first water grids 406, the coordinate generation module 402 generates a third dimension coordinate 412 for each of the first water grids 406 based on the following equation:

$$H_w = \sum_{i=0}^{n} tex2D(wave_i, V_{pos}.xz/scale_i)$$

wherein $H_w$ is the third dimension coordinate in y-axis, i.e., the actual water surface height with reference to the water wave, $wave_i$ is the corresponding water wave map, $V_{pos}.xz$ is the two-dimension coordinate of the first water grids 406, and $scale_i$ is a pre-determined constant, wherein the pre-determined constant $scale_i$ is defined by users to control the frequencies of ripples. In addition, the objects in the water are reflected and/or refracted by the water. To consider the reflection and refraction effect, the coordinate generation module 402 generates a third-dimension world coordinate 414 indicating a height difference between vertexes of the objects and the actual water surface height according to two-dimension world coordinates 413 of the vertexes, wherein the two-dimension world coordinates 413 are converted by a vertex shader.

Then, the image generation module 403 generates a water surface based on the vertex shader according to the two-dimension coordinate of the second water grids 407 and the third dimension coordinate 412. And the image generation module 403 further determines the vertexes of the objects are under or above the actual water surface according to the two-dimension world coordinates 413, height coordinates of the vertexes, and the third-dimension world coordinates 414, wherein the height coordinates are converted by the vertex shader. After that, the image generation module 403 further generates a reflection image and a refraction image for the objects. Finally, with the usage of the pixel shader, the image generation module 403 merges the water surface, the reflection image, and the refraction image into a water surface image 415 which shows light changes.

Figure 7:
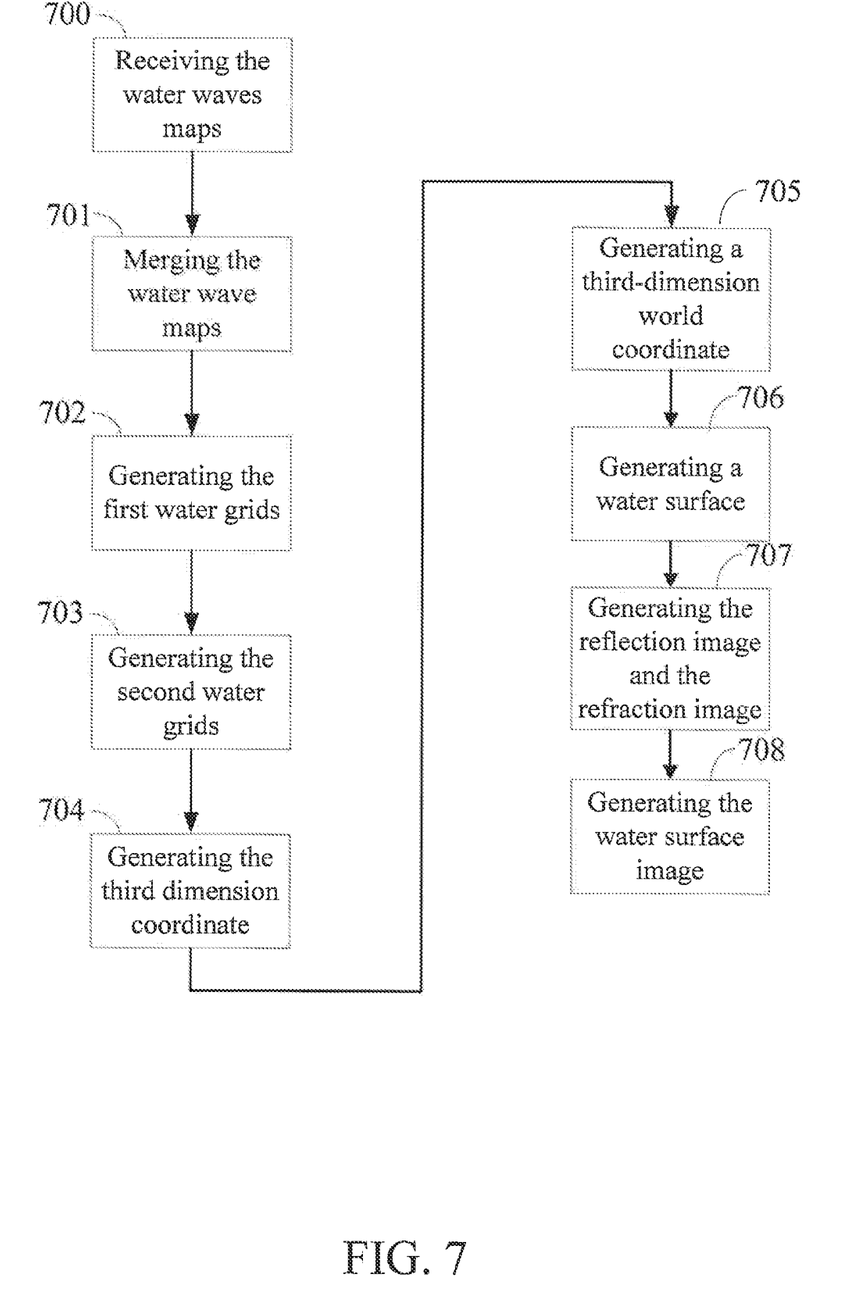
FIG. 7 is a flow chart of a second embodiment of the invention.

A second embodiment of the invention is shown in FIG. 7, which is a method for drawing a water surface. First, step 700 is executed to receive a plurality of water wave maps, wherein the water wave maps are pre-generated. Step 701 is then executed to merge the water wave maps into a merged water wave map which approximates real water waves, wherein the merged water wave map is a 2D map.

Figure 8:
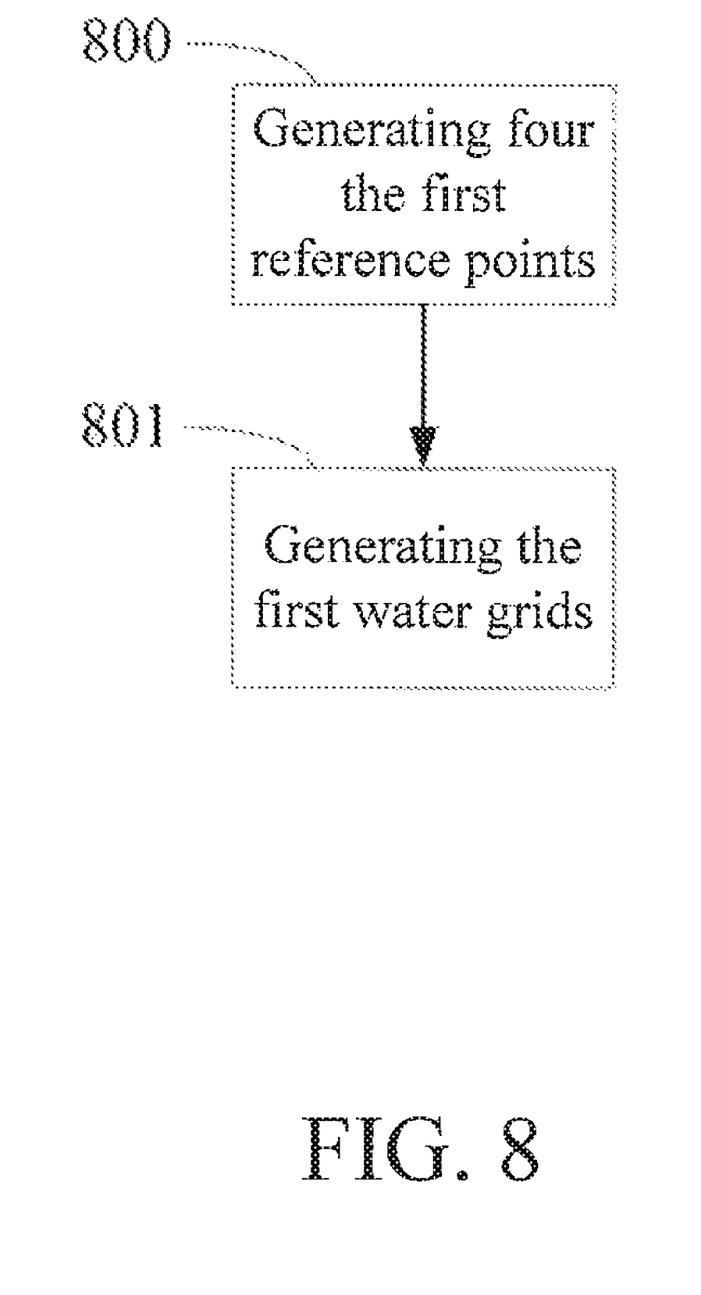
FIG. 8 is a flow chart of step of generating the water grids in the second embodiment.

Steps 702 and 703 are executed to generate the first water grids and the second water grids respectively. More particularly, as shown in FIG. 8, step 702 can be divided into the following steps. Step 800 is first executed to generate four first reference points on the boundary of the actual water surface of each of the water wave maps. In particular, the first reference points are the apexes of the actual water surface, i.e., the apexes 603, 604, 605, and 606 in FIG. 6. Then, step 801 is executed to use a pixel shader to generate the first water grids, as the grids in the grid map 608, according to the first reference points. Each of the first water grids has a two-dimension coordinate in x-axis and the z-axis. Hence, step 801 is to convert the actual water surface of the water wave maps into grid maps. Step 703 is similar to step 702 to generate the second reference points, and then to generate the second water grids, as the grids of the grid map 608, according to the second reference points. The second reference points are the apexes of the actual water surface of the merged water wave map, such as the apexes 603, 604, 605, and 606 in FIG. 6. Each of the second water grids has a two-dimension coordinate in x-axis and the z-axis.

According to the two-dimension coordinate of each of the first water grids, step 704 is executed to generate a third dimension coordinate for each of the first water grids based on the following equation:

$$H_w = \sum_{i=0}^{n} tex2D(wave_i, V_{pos}.xz/scale_i)$$

To consider the reflection and refraction effect, step 705 is executed to generate a third-dimension world coordinate indicating a height difference between vertexes of the objects and the actual water surface height according to two-dimension world coordinates of the vertexes, wherein the two-dimension world coordinates are converted by a vertex shader.

Next, step 706 is executed to generate a water surface according to the two-dimension coordinate of the second water grids and the third dimension coordinate of each of the first water grids. After that, step 707 is executed to generate the reflection image and the refraction image according to the two-dimension world coordinates, the third-dimension world coordinates, and height coordinates of the vertexes, wherein the height coordinates are converted by the vertex shader. Finally, step 708 is executed to generate the water surface image which shows light changes according to the water surface, the reflection image, and the refraction image.

In addition to the steps in FIG. 7 and FIG. 8, the method of the second embodiment is able to execute of all the operations in the first embodiment. Those skilled in the art can straightforwardly realize how the second embodiment performs these operations and functions based on the above descriptions of the first embodiment, and thus no unnecessary detail is given.

Figure 9:
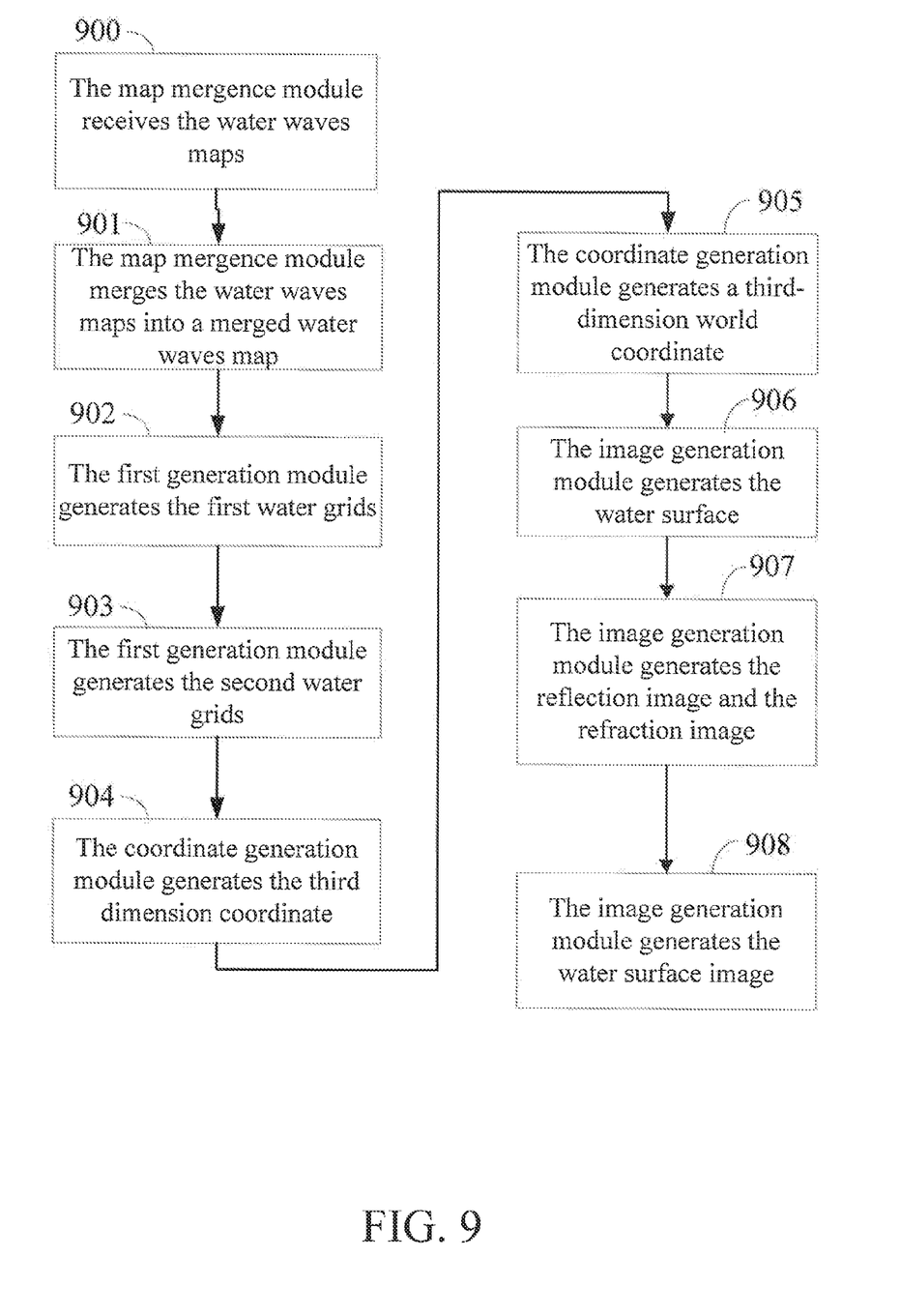
FIG. 9 is a flow chart of a third embodiment of the invention.

A third embodiment of the invention is shown in FIG. 9, which is a method for drawing a water surface applied to the apparatus 4. The method is executed by a computer program which is stored in a computer readable medium. In step 900, the computer program has code for the map mergence module 400 to receive the water wave maps. In step 901, the computer program has code for the map mergence module 400 to merge the water wave maps into the merged water wave map. Then step 902 and 903 are executed in which the computer program has code for the first generation module 401 to generate the first water grids and the second water grids, respectively. To execute step 902, the computer program has code to execute the following steps shown in FIG. 10. In step 1000, the computer program has code for the retrieval module 408 to generate the four fist reference points on the boundary of the actual water surface 607 of each of the water wave maps. Then, step 1001 is executed in which the computer program has code for the grid generation module 409 to use the pixel shader to generate the first water grids according to the first reference points. Each of the first water grids has a two-dimension coordinate in x-axis and the z-axis. Step 903, similar to step 902, the computer program has code for the retrieval module 408 to generate the four the second reference points, and the computer program has code for the grid generation module 409 to generate the second water grids according to the second reference points. Each of the second water grids has a two-dimension coordinate in x-axis and the z-axis.

According to the two-dimension coordinate of each of the first water grids, step 904 us executed in which the computer program has code for the coordinate generation module 402 to generate a third dimension coordinate for each of the first water grids based on the following equation:

$$H_w = \sum_{i=0}^{n} tex2D(wave_i, V_{pos}.xz/scale_i)$$

To consider the reflection and refraction effect, step 905 is executed in which the computer program has code for the coordinate generation module 402 to generate the third-dimension world coordinate indicating a height difference between vertexes of the objects and the actual water surface height according to the two-dimension world coordinates of the vertexes.

Next, step 906 is executed in which the computer program has code for the image generation module 403 to generate the water surface according to the two-dimension coordinate of the second water grids and the third dimension coordinate of each of the first water grids. After that, step 907 is executed in which the computer program has code for the image generation module 403 to generate the reflection image and the refraction image according to the two-dimension world coordinates, the third-dimension world coordinate, and the height coordinates of the vertexes. Finally, step 908 is executed in which the computer program has code for the image generation module 403 to generate the water surface image 415 which shows light changes according to the water surface, the reflection image, and the refraction image.

Figure 10:
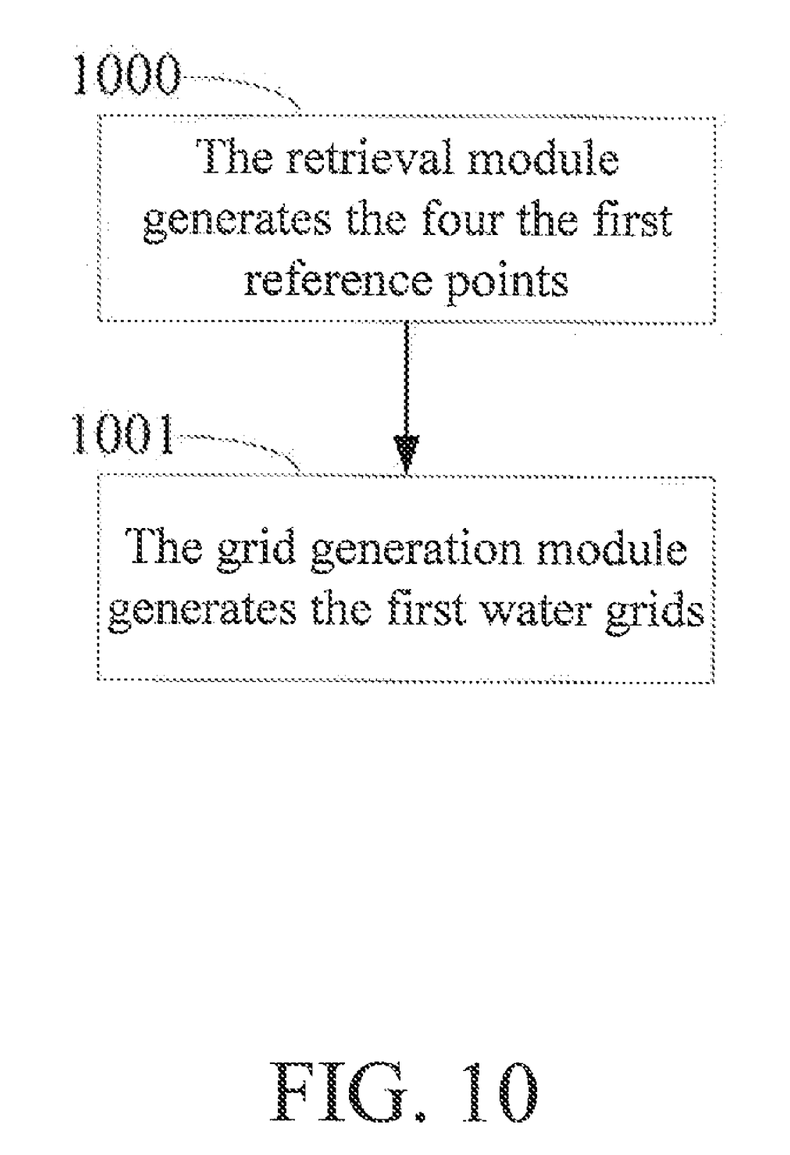
FIG. 10 is a flow chart of the step of generating the water grids in the third embodiment.

In addition to the steps in FIG. 9 and FIG. 10, the method of the third embodiment is able to execute of all the operations in the first embodiment. Those skilled in the art can straightforwardly realize how the third embodiment performs these operations and functions based on the above descriptions of the first embodiment, and thus no unnecessary detail is given.

The computer readable medium can be a floppy disk a hard disk, an optical disk, a flash disk, a tape, a database accessible from a network or a storage medium with the same functionality that can be easily thought by people skilled in the art.

Figure 11:
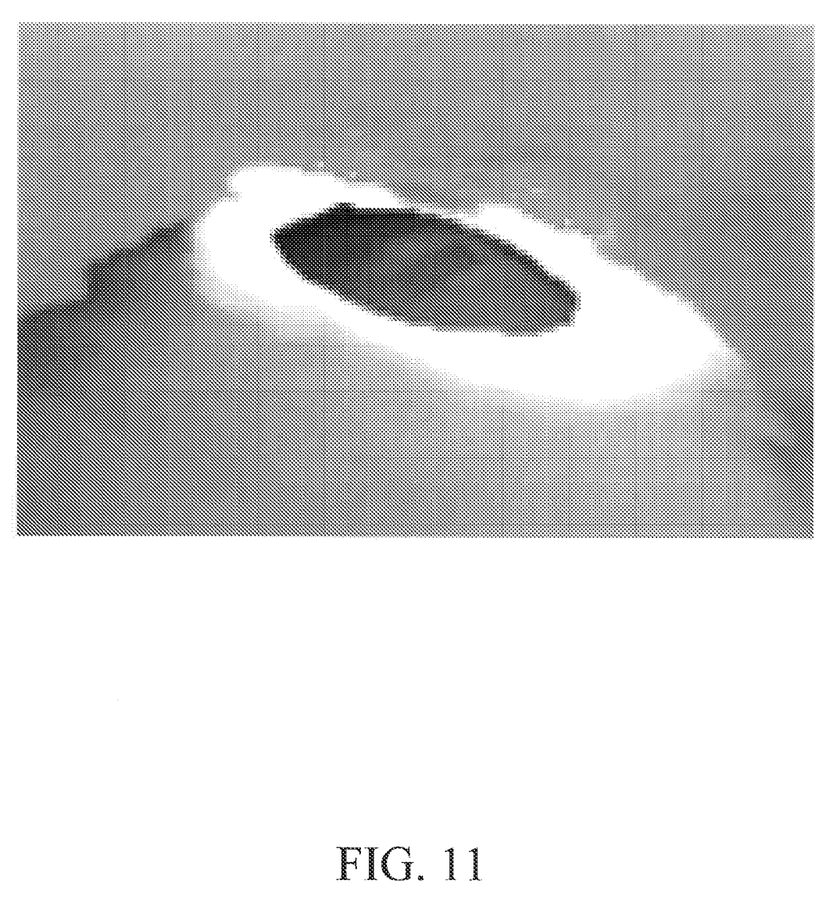
FIG. 11 is a 3D picture drawn with the invention.
Figure 12:
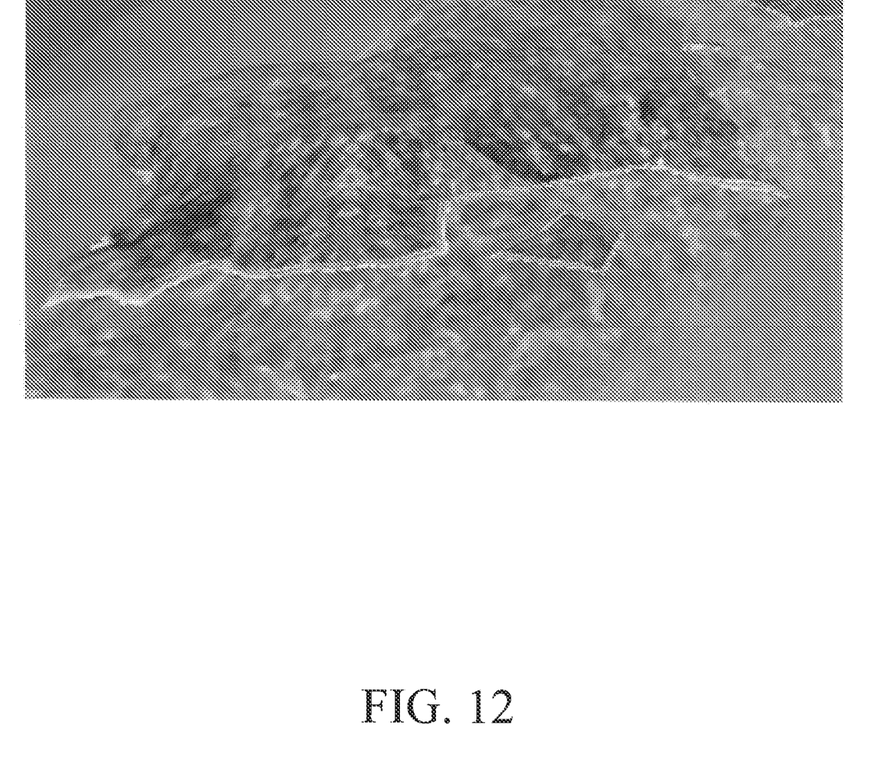
FIG. 12 is another 3D picture drawn with the invention.

The invention can dynamically obtain the information of the actual water surface height and generate the water surface image according to the information of the actual water surface height. When there are objects under or above the water surface, the invention further generates the reflection image and the refraction image according to the information of the actual water surface height and merges the reflection image, the refraction image, and the water surface image. As shown in FIG. 11 and FIG. 12, the present invention makes the bubble in the right position, and makes the refraction correctly shown.

The above disclosure is related to the detailed technical contents and inventive features thereof. People skilled in this field may proceed with a variety of modification and replacements based on the disclosures and suggestions of the invention as described without departing from the characteristics thereof. Nevertheless, although such modification and replacements are not fully disclosed in the above descriptions, they have substantially been covered in the following claims as appended.

What is claimed is:

1. An apparatus for drawing a water surface, comprising:
    a map mergence module for merging a plurality of water wave maps into a merged water wave map;
    a first generation module for generating a plurality of first water grids in a visible range of each of the water wave maps and generating a plurality of second water grids in the visible range of the merged waves map, wherein each of the first water grids and the second water grids has a two-dimension coordinate;
    a coordinate generation module for generating a plurality of corresponding third-dimension coordinates according to the two-dimension coordinates of the first water grids; and
    an image generation module for generating the water surface according to the corresponding third-dimension coordinates and the two-dimension coordinates of the second water grids.

2. The apparatus of claim 1, wherein the coordinate generation module generates a third-dimension world coordinate indicating a height difference between a vertex of an object and a water height according to a two-dimension world coordinate of the vertex, and the two-dimension world coordinate is converted by the vertex shader.

3. The apparatus of claim 2, wherein the image generation module further generates a reflection image and a refraction image according to the two-dimension world coordinate, the third-dimension world coordinate, and a height coordinate, and a water surface image is generated further according to the reflection image the refraction image, the corresponding third-dimension coordinates and the two-dimension coordinates of the second water grids, and the height coordinate is converted by the vertex shader.

4. The apparatus of claim 1, wherein the first generation module comprises:
    a retrieval module for retrieving a plurality of first reference points around the visible range of each of the water wave maps and a plurality of second reference points around the visible range of the merged water wave map; and
    a grid generation module for generating the first water grids according to the first reference points and the second water grids according to the second reference points.

5. The apparatus of claim 4, wherein the first reference points and the second reference points are vertexes of the visible range.

6. The apparatus of claim 1, wherein the water wave maps are one of a sine wave map, a cosine wave map, a fast Fouier transform wave map, and a combination thereof.

7. A method for drawing a water surface, the method being applied to an apparatus, the apparatus comprising a map mergence module, a first generation module, a coordinate generation module and an image generation module, the method comprising the following steps:
    enabling the map mergence module to merge a plurality of water wave maps into a merged water wave map;
    enabling the first generation module to generate a plurality of first water grids in a visible range of each of the water wave maps, wherein each of the first water grids has a two-dimension coordinate;
    enabling the first generation module to generate a plurality of second water grids in the visible range of the merged waves map, wherein each of the second water grids has a two-dimension coordinate;
    enabling the coordinate generation module to generate a plurality of corresponding third-dimension coordinates according to the two-dimension coordinates of the first water grids; and
    enabling the image generation module to generate the water surface according to the corresponding third-dimension coordinates and the two-dimension coordinates of the second water grids.

8. The method of claim 7, wherein the step of generating the corresponding third dimension coordinate comprises the step of enabling the coordinate generation module to generate a third-dimension world coordinate indicating a height difference between a vertex of an object and a water height according to a two-dimension world coordinate of the vertex, and the two-dimension world coordinate is converted by the vertex shader.

9. The method of claim 8, wherein the step of generating the water surface comprises the step of enabling the image generation module to generate a reflection image and a refraction image according to the two-dimension world coordinate, the third-dimension world coordinate, and a height coordinate, and the height coordinate is converted by the vertex shader.

10. The method of claim 9, wherein the step of generating the water surface comprises the step of enabling the image generation module to generate a water surface image according to the reflection image, the refraction image, the third dimension coordinates, and the two-dimension coordinate of the second water grids.

11. The method of claim 7, wherein the first generation module comprises a retrieval module and a grid generation module, the step of generating the first water grids comprises the following steps:
  enabling the retrieval module to retrieve a plurality of first reference points around the visible range of the water wave maps; and
  enabling the grid generation to generate the first water grids according to the first reference points.

12. The method of claim 7, wherein the first generation module comprises a retrieval module and a grid generation module, the step of generating the second water grids comprises the following steps:
  enabling the retrieval module to retrieve a plurality of second reference points around the visible range of the composed water wave map; and
  enabling the grid generation to generate the second water grids according to the second reference points.

13. The method of claim 11, wherein the first reference points are the apexes of the visible range.

14. The method of claim 12, wherein the second reference points are the apexes of the visible range.

15. A computer readable medium storing a computer program to execute a method for drawing a water image, the method comprising the following steps:
  merging a plurality of water wave maps into a merged water wave map;
  generating a plurality of first water grids in a visible range of each of the water wave maps, wherein each of the first water grids has a two-dimension coordinate;
  generating a plurality of second water grids in the visible range of the merged waves map, wherein each of the second water grids has a two-dimension coordinate;
  generating a plurality of corresponding third-dimension coordinates according to the two-dimension coordinates of the first water grids; and
  generating the water surface according to the corresponding third-dimension coordinates and the two-dimension coordinates of the second water grids.

16. The computer readable medium of claim 15, wherein the step of generating the corresponding third dimension coordinate comprises the step of generating a third-dimension world coordinate indicating a height difference between a vertex of an object and a water height according to a two-dimension world coordinate of the vertex, and the two-dimension world coordinate is converted by the vertex shader.

17. The computer readable medium of claim 16, wherein the step of generating the water surface comprises the step of generating a reflection image and a refraction image according to the two-dimension world coordinate, the third-dimension world coordinate, and a height coordinate, and the height coordinate is converted by the vertex shader.

18. The computer readable medium of claim 17, wherein the step of generating the water surface comprises the step of generating a water surface image according to the reflection image, the refraction image, the third dimension coordinates, and the two dimension coordinate of the second water grids.

19. The computer readable medium of claim 15, wherein the step of generating the first water grids comprises the following steps:
  retrieving a plurality of first reference points around the visible range of the water wave maps; and
  generating the first water grids according to the first reference points.

20. The computer readable medium of claim 15, wherein the step of generating the second water grids comprises the following steps:
  retrieving a plurality of second reference points around the visible range of the composed water wave map; and
  generating the second water grids according to the second reference points.

21. The computer readable medium of claim 19, wherein the first reference points are the apexes of the visible range.

22. The computer readable medium of claim 20, wherein the second reference points are the apexes of the visible range.

* * * * *